(No Model.)

J. W. GRISWOLD.
BALE TIE.

No. 302,202. Patented July 15, 1884.

Witnesses:
Wm. F. Schlingloff
Elnathan B. Tyler.

Inventor.

N. PETERS. Photo-Lithographer, Washington, D. C.

UNITED STATES PATENT OFFICE.

J. WOOL GRISWOLD, OF TROY, NEW YORK.

BALE-TIE.

SPECIFICATION forming part of Letters Patent No. 302,202, dated July 15, 1884.

Application filed April 21, 1884. (No model.)

*To all whom it may concern:*

Be it known that I, JOHN WOOL GRISWOLD, a citizen of the United States, residing at Troy, in the county of Rensselaer and State of New York, have invented certain new and useful Improvements in Wire Bale-Ties, of which the following is a specification.

My invention consists in certain improvements in wire bale-ties whereby the hook (or the holding portion of the hook) will be braced against being drawn forward when subjected to a pulling strain from the loop in a more effective manner than is had in that class of bale-ties which have their hooks braced by a forwardly-projecting portion bearing on the upper side of the loop, as heretofore employed; and it relates to wire bale-ties in which is employed at one end an oblong loop and at the opposite end a hook which is provided with a holding or hooking portion that will pull against the forward end of the opening of the loop, and a bracing portion which will push against the rear end of the opening of the loop and react against the pulling strain of the loop when it is exerted on the holding portion of the hook, and thereby effectually prevent that portion of the hook from being drawn forward.

The object of my invention is, primarily, to remedy the defects heretofore attending that class of bale-ties employing braced hooks, and to provide a hook which will have made with its holding portion a bracing-foot which will be received between the sides of the opening of the loop and have a bearing against the rear end of the same, so that it will react against the pulling force exerted on the hook to hold it from being drawn forward; and, secondarily, to provide a specific form of hook and loop which will operate together to hold the hook from being drawn forward and the loop from being elongated when the expansive force of the bale is exerted on the bale-band. I attain these objects by the means illustrated in the accompanying drawings, forming a part of this specification, in which—

Figure 1:
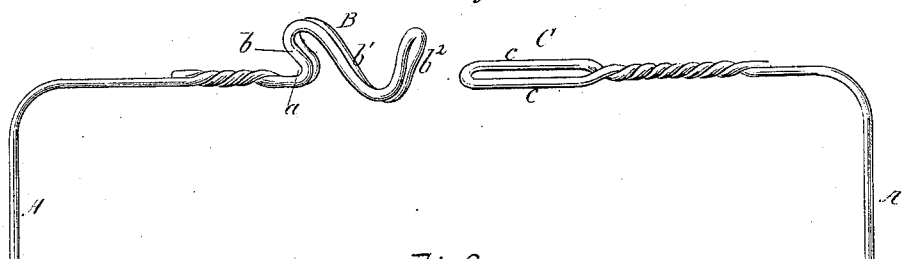
Figure 2:
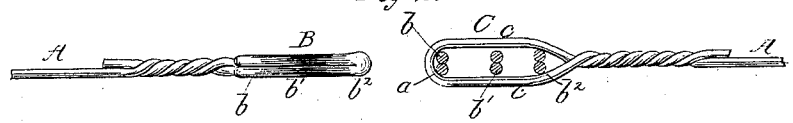
Figure 3:
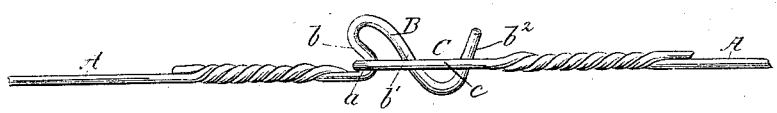
Figure 4:
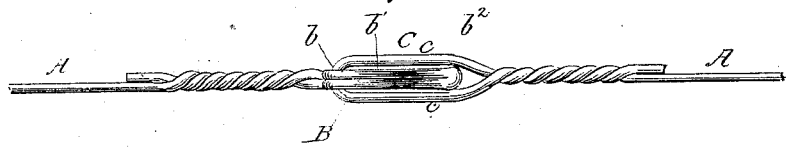
Figure 5:
Figure 7:
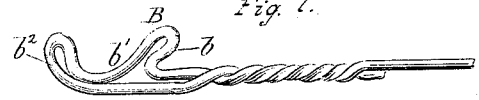
Figure 6:
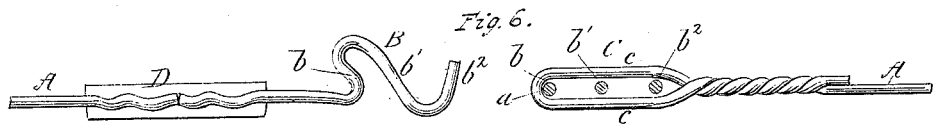

Figure 1 represents a bale-band provided with my improved hook and loop. Fig. 2 is a plan view of the hook and loop, and illustrates the manner in which the portions of the hook and loop operate together. Fig. 3 is a side elevation of the hook and loop when connected together. Fig. 4 is a plan view of the same. Fig. 5 is a perspective view of a hook embodying my improvement applied to two strands (one a short piece) twisted together. Fig. 6 is a side elevation of my improved hook formed of a single piece or strand and united to the wire forming the bale-band, and illustates the manner in which the hook and loop operate together; and Fig. 7 is another modification.

The same letters of reference refer to similar parts throughout the several views.

In the drawings, A represents the bale-band, formed of wire. B is the hook connected with one end of the band, and C the loop made with the opposite end of the same.

Hook B is made with a form not unlike the letter S in its portion forward of its twisted neck, and is made to include the holding portion $b$, downwardly-inclined strut portion $b'$, and bracing-foot $b^2$, substantially as shown in Figs. 1, 3, 5, and 6. The lower end of the bracing-foot $b^2$ connects with the lower end of strut portion $b$ at a point below the line of direction of loop C when in engagement with the hook, as shown in Fig. 3.

Loop C is made with an oblong form, substantially as shown in Figs. 2 and 6, and has its sides $c\ c$ arranged about parallel to a distance from its front end about equal to the length of hook B between point of draft $a$ and the rear side of bracing-foot $b^2$, as illustrated in Figs. 2, 3, 4, and 6. The opening of this loop between its sides $c\ c$ is made with a width about equal to the width of the body of hook B across from side to side, as illustrated in Figs. 2, 4, and 6. This loop will permit said hook to be easily passed through it endwise, and be received between its sides $c\ c$, as shown. I prefer to form this loop by bending one end of the wire band on itself and uniting this turned-back portion with the body of the strand by twisting the portions together, as practiced by the trade, though the loop may be made of cast metal, or be formed from sheet metal by means of dies, and united to the band by any known process or manner.

The hook B may be made by turning the opposite end portion of the wire band back on itself and twisting the turned-back portion in with the body of the band, and crimping the portions $b\ b'\ b^2$ in form shown, by any proper instrument; or the hook may be formed by twisting a short piece of wire in with the main strand forming the band and crimping the untwisted end portions into form, substantially as shown in Fig. 5; or, if preferred, the hook may be formed of a single piece of wire having a diameter a little greater than that of the band A, as illustrated in Fig. 6. This single wire hook will be united to the band A by connecting-piece D, or in any other known manner; or, again, the hook may be formed of cast metal and united to the band, or be formed of a single strand, as shown in Fig. 7.

When it is desired to connect hook B with loop C, the operator will pass the former endwise through the latter in direction indicated by dotted lines in Fig. 3, and draw the hook back, so that its holding portion $b$ will at $a$ engage with the front end of loop C, when strut portion $b'$ and bracing-foot $b^2$ will drop down to a short distance into the opening of the loop, with the front end of the bracing-foot bearing against the inner side of the rear end of loop C, and with the sides of this foot and strut about touching the inner surfaces of sides $c\,c$ of the same, as illustrated in Figs. 2, 4, and 6. In this position and situation of parts $b'$ and $b^2$ of the hook, the loop will be held from being elongated when it is being drawn on against the hook, and at the same time bracing-foot $b^2$ will, by its bearing against the rear end of the wire opening of the loop and the bracing operation of strut portion $b'$, be made to react against the pulling force exerted on the holding portion $b$ by the draft from the loop, and hold said portion $b$ of the hook from being drawn forward.

By the above-described improvements I obviate the defects heretofore attending the old form of braced hooks, which project forward from the upper end of their holding or hook portions and bear on the upper side of the loop or on the twisted neck. In these old forms of braced hooks the resistance they offered to the pull of the loop is wholly dependent on the stiffness of the metal, while in my improvements the strut and bracing foot portions operate effectively with the loop to hold the hook from being drawn forward, whether the metal is stiff or not; and I am enabled to employ in my improved bale-tie tough and pliable and well-annealed wire without any regard to the stiffness of the same, and am thereby enabled to employ wire which cannot be employed with the old form of braced hooks. In these old forms of braced hooks the loops were necessarily made with an oval form, and under strain would elongate by the sides being straightened and drawn together at their twisted necks. This feature is objectionable in these old bale-ties, as this elongation and contraction of the sides of the loop made the bearing of the brace on the loop uncertain. By my improvements the loop is prevented from being elongated and its sides from becoming contracted under a pulling strain on the tie by the action of the limbs of the bracing-hook entering between the side strands of the loop.

Having described my invention, what I claim, and desire to secure by Letters Patent, is—

1. In a wire bale-tie, a hook provided on its forward end with a bracing-foot which will have bearing against the metal of the loop at the rear end of its opening thereof, and within the loop at the same time the pulling force of the loop is being exerted on the holding portion of the hook, substantially as set forth.

2. In a wire bale-tie, a hook which is provided with a holding or hooking portion at its twisted neck and a bracing-foot portion at its forward end, with a strut portion connecting said bracing-foot with said holding or hooking portion, for operations with a loop made with the opposite end of the band, substantially as set forth.

3. In a wire bale-tie, the loop C, having its sides $c\,c$ about parallel and with a width about equal to the width of the hook, for operations with a hook provided with bracing-foot $b^2$ in its forward end, substantially as and for the purposes set forth.

4. In a wire bale-tie, the combination, with oblong loop C, made with one end of a wire band, of hook B, composed of portions $b$, $b'$, and $b^2$, substantially as set forth, for operations and purposes described.

5. In a wire bale-tie, a hook and a loop, the hook being provided at its front end with a bracing-foot, and the loop being made with an oblong form of opening for receiving both the holding and bracing portions of the hook, with its side portions pinching on the sides of the bracing-foot to sustain it against the pull of the holding portion of the hook, substantially as and for the purposes set forth.

J. WOOL GRISWOLD.

Witnesses:
WM. F. SCHLINGLOFF,
ELNATHAN B. TYLER.